(12) United States Patent
Mukherjee et al.

(10) Patent No.: US 12,388,813 B2
(45) Date of Patent: Aug. 12, 2025

(54) ENHANCED SECURITY WITH MULTIPLE FACTOR AUTHENTICATION AT DEVICES USING PARTITIONS

(71) Applicant: Bank of America Corporation, Charlotte, NC (US)

(72) Inventors: Maharaj Mukherjee, Poughkeepsie, NY (US); George Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 222 days.

(21) Appl. No.: 18/137,459

(22) Filed: Apr. 21, 2023

(65) Prior Publication Data

US 2024/0356914 A1 Oct. 24, 2024

(51) Int. Cl.
*H04L 9/06* (2006.01)
*G06F 21/00* (2013.01)
*H04L 9/40* (2022.01)
*H04L 9/14* (2006.01)

(52) U.S. Cl.
CPC ...... *H04L 63/0838* (2013.01); *H04L 63/0861* (2013.01); *H04L 63/1491* (2013.01)

(58) Field of Classification Search
CPC ............. H04L 63/0838; H04L 63/0861; H04L 63/1491
See application file for complete search history.

(56) References Cited

U.S. PATENT DOCUMENTS

| | | | |
|---|---|---|---|
| 6,330,653 B1 | 12/2001 | Murray et al. | |
| 7,516,336 B2 | 4/2009 | Rothman et al. | |
| 8,572,684 B1 * | 10/2013 | Sama | H04L 63/0838 726/4 |
| 8,939,492 B2 | 1/2015 | Gaudig et al. | |
| 9,202,035 B1 * | 12/2015 | Manusov | G06F 21/32 |
| 11,240,230 B2 * | 2/2022 | Cho | G06F 21/35 |
| 11,429,396 B1 | 8/2022 | Suryanarayana et al. | |
| 2003/0039507 A1 | 2/2003 | Liu | |
| 2007/0130453 A1 | 6/2007 | Lewites | |

(Continued)

FOREIGN PATENT DOCUMENTS

WO WO-2007091872 A2 * 8/2007 ............. G06Q 20/10

OTHER PUBLICATIONS

Zixuan Ding; Ding Wang; "HTOTP: Honey Time-Based One-Time Passwords"; IEEE Transactions on Information Forensics and Security; Year: Mar. 2025 | vol. 20 | Journal Article | Publisher: IEEE; pp. 4438-4453 (Year: 2025).*

*Primary Examiner* — Fatoumata Traore
*Assistant Examiner* — Courtney D Fields
(74) *Attorney, Agent, or Firm* — Banner & Witcoff, Ltd.

(57) ABSTRACT

A computing device may configure a plurality of device partitions. The computing device may send, to a one time password (OTP) server and via an interface of a first partition of the plurality of device partitions, a login request. The computing device may receive, at a second partition of the plurality of device partitions, an OTP. The computing device may access, by validating authentication credentials corresponding to the second partition of the plurality of device partitions, the OTP. The computing device may send, to the OTP server, the OTP. The computing device may access, upon receiving confirmation of validation of the OTP, services hosted by the OTP server.

20 Claims, 11 Drawing Sheets

(56) References Cited

U.S. PATENT DOCUMENTS

| | | |
|---|---|---|
| 2011/0125977 A1 | 5/2011 | Karr et al. |
| 2011/0181499 A1 | 7/2011 | Ueno |
| 2012/0084866 A1* | 4/2012 | Stolfo ................ H04L 63/1416 |
| | | 726/25 |
| 2014/0075360 A1 | 3/2014 | Wang |
| 2014/0208091 A1 | 7/2014 | Koning et al. |
| 2015/0350251 A1 | 12/2015 | Brander et al. |
| 2018/0034822 A1* | 2/2018 | Mistry ................ H04W 12/37 |
| 2019/0244370 A1 | 8/2019 | Jaroch |
| 2019/0286355 A1 | 9/2019 | Bhagwat et al. |
| 2022/0107743 A1 | 4/2022 | Yang et al. |
| 2022/0216990 A1 | 7/2022 | Mukherjee et al. |
| 2022/0309506 A1 | 9/2022 | Yassibas et al. |
| 2022/0360448 A1 | 11/2022 | Sahni |
| 2022/0407851 A1 | 12/2022 | Marzorati et al. |
| 2023/0029152 A1 | 1/2023 | Zaloum et al. |
| 2023/0093143 A1 | 3/2023 | Kaidi et al. |

* cited by examiner

Enrollment Information

Please note that for security reasons, a decoy OTP may be sent prior to an actual OTP. You will be alerted of the decoy by the following sentence confirming that the OTP has been sent:

"You should receive your OTP in just a second."

In these instances, please enter the second OTP that is received rather than the first OTP received.

FIG. 5

Enrollment Information

Please note that for security reasons, your OTP may be sent to a different device partition. You will be alerted of the partition by a checkmark located in a corresponding corner of the interface. For example, top left = partition 1, top right = partition 2, bottom left = partition 3, and bottom right = partition 4.

In these instances, please access the corresponding partition to identify the OTP.

FIG. 6

ENHANCED SECURITY WITH MULTIPLE FACTOR AUTHENTICATION AT DEVICES USING PARTITIONS

BACKGROUND

In some instances, multi-factor authentication (e.g., involving one time passwords (OTP)), may be used to increase application security. For example, if a mobile device is used to login to an account using a browser, the website may require an OTP which may be sent either by text, voice, email, or otherwise on the mobile device. In some instances, however, where a bad or otherwise unintended actor has access to the mobile device, it may be easy for them to access the OTP. This may reduce the value of the additional authentication factor. Accordingly, it may be important to improve the OTP processes to provide enhanced application security, while balancing the user experience.

SUMMARY OF THE INVENTION

Aspects of the disclosure provide effective, efficient, scalable, and convenient technical solutions that address and overcome the technical problems associated with one time passwords (OTP). In accordance with one or more embodiments of the disclosure, a computing device comprising at least one processor, a communication interface, and memory storing computer-readable instructions may configure a plurality of device partitions. The computing device may send, to a one time password (OTP) server and via an interface of a first partition of the plurality of device partitions, a login request. The computing device may receive, at a second partition of the plurality of device partitions, an OTP. The computing device may access, by validating authentication credentials corresponding to the second partition of the plurality of device partitions, the OTP. The computing device may send, to the OTP server, the OTP. The computing device may access, upon receiving confirmation of validation of the OTP, services hosted by the OTP server.

In one or more instances, the plurality of device partitions may include: one or more hardware partitions and one or more virtual partitions. In one or more instances, receiving, at the second partition of the plurality of device partitions, the OTP may include receiving a first portion of the OTP, where a second portion of the OTP may be received at a third partition of the plurality of device partitions.

In one or more examples, the computing device may automatically assemble, after validating authentication credentials corresponding to the third partition of the plurality of device partitions, the OTP using the first portion and the second portion. In one or more examples, the authentication credentials corresponding to the second partition of the plurality of device partitions may be different than the authentication credentials corresponding to the third partition of the plurality of device partitions.

In one or more instances, accessing the OTP may include accessing a decoy OTP prior to accessing the OTP. In one or more instances, the computing device may enroll, prior to sending the login request, with the OTP server. The computing device may receive, from the OTP server, a notification indicating the decoy OTP, where the notification may identify characteristics of an interface, to be displayed based on the login request, to warn of the decoy OTP, and where the decoy OTP may be selectively sent in response to a portion of login requests.

In one or more examples, the OTP server may be configured to: identify use of the decoy OTP by a different computing device, and initiate, based on identification of the decoy OTP by the different computing device, one or more security actions. In one or more examples, the one or more security actions may include one or more of: tracing the different computing device, wiping the computing device, locking at least one of the plurality of device partitions, prompting for entry of a code at the computing device, or notifying an authority.

In one or more instances, the authentication credentials may include biometric credentials. In one or more instances, the OTP may be sent to a randomly selected partition of the plurality of device partitions each time a login request is received.

BRIEF DESCRIPTION OF DRAWINGS

The present disclosure is illustrated by way of example and not limited in the accompanying figures in which like reference numerals indicate similar elements and in which:

FIGS. 5 and 6 depict illustrative user interfaces for using device partitions to provide enhanced security in OTP multi-factor authentication in accordance with one or more example embodiments.

DETAILED DESCRIPTION

Figure 1A:
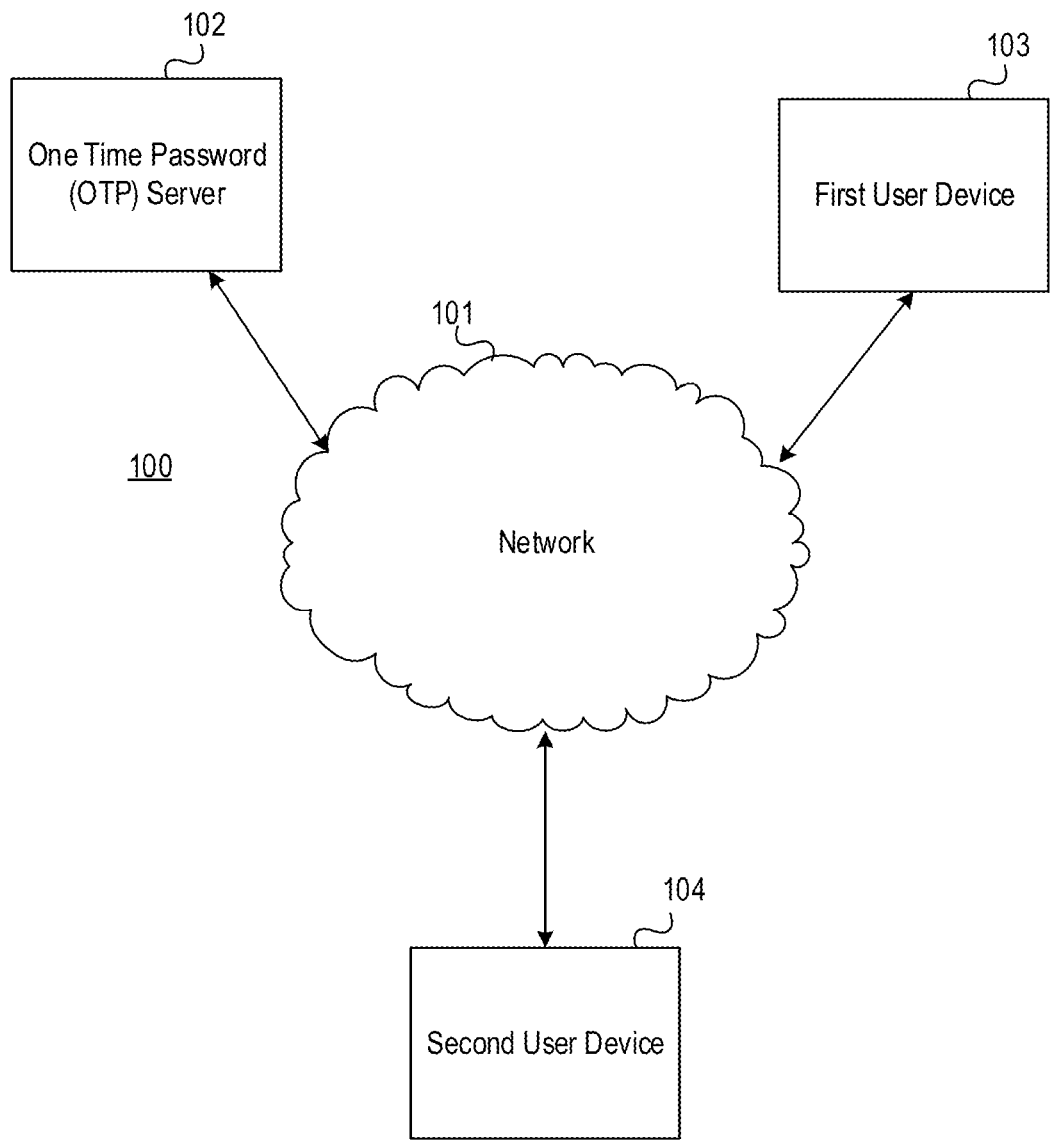
FIGS. 1A-1C depict an illustrative computing environment for using device partitions to provide enhanced security in OTP multi-factor authentication in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to device partitions that may be used to improve the security of OTPs. For example, often the same physical device may be used for multi-factor authentication through using different applications. For example, if a mobile device is used to login to an account using a browser, the website may require an OTP, which may be sent by text, voice, email, and/or otherwise to the same device. If someone has access to the device, it may be easy for them to access the OTP. This may reduce the value of the second authentication factor, since it may become almost inconsequential.

Described herein is a solution to this problem, which teaches a system and method for creating multiple physical or virtual partitions of the device itself, which may divide the device into two or more different entities. In some examples, the same partition might not be used for multi-factor authentication.

A physical partition may divide the existing hardware into two or more segments and may used different copies of an operating system on each of the physical partitions. A virtual partition might not divide the existing hardware physically, but may use a virtual operating system on a single physical partition, and may use multiple operating systems to create two virtually different devices on the same physical device.

In either solution, the same subscriber identity module (SIM) card or telephone number may be used. The multiple operating systems on each partition may be either the same or different. Some of the operating systems may be of rudimentary functionalities and may be used only for the purpose of authentication only.

In some arrangements, each physical or virtual partition may have a different authentication mechanism to make them mutually exclusive from one another. When a user is trying to login to an account using a browser and the website prompts for an OTP to be sent by text, voice, email, and/or otherwise, the OTP may be sent to a different partition than the one being used for the authentication.

In doing so, the increased security benefit of using different devices for authentication may be achieved without the inconvenience of carrying two different devices. The partitions may also use different encryption and shielding to ensure no data is leaked. The switch from one partition to another may be as seamless as swiping to the left or right, and may be biometrically enabled.

These and various other aspects will be described more fully herein.

Figure 1B:
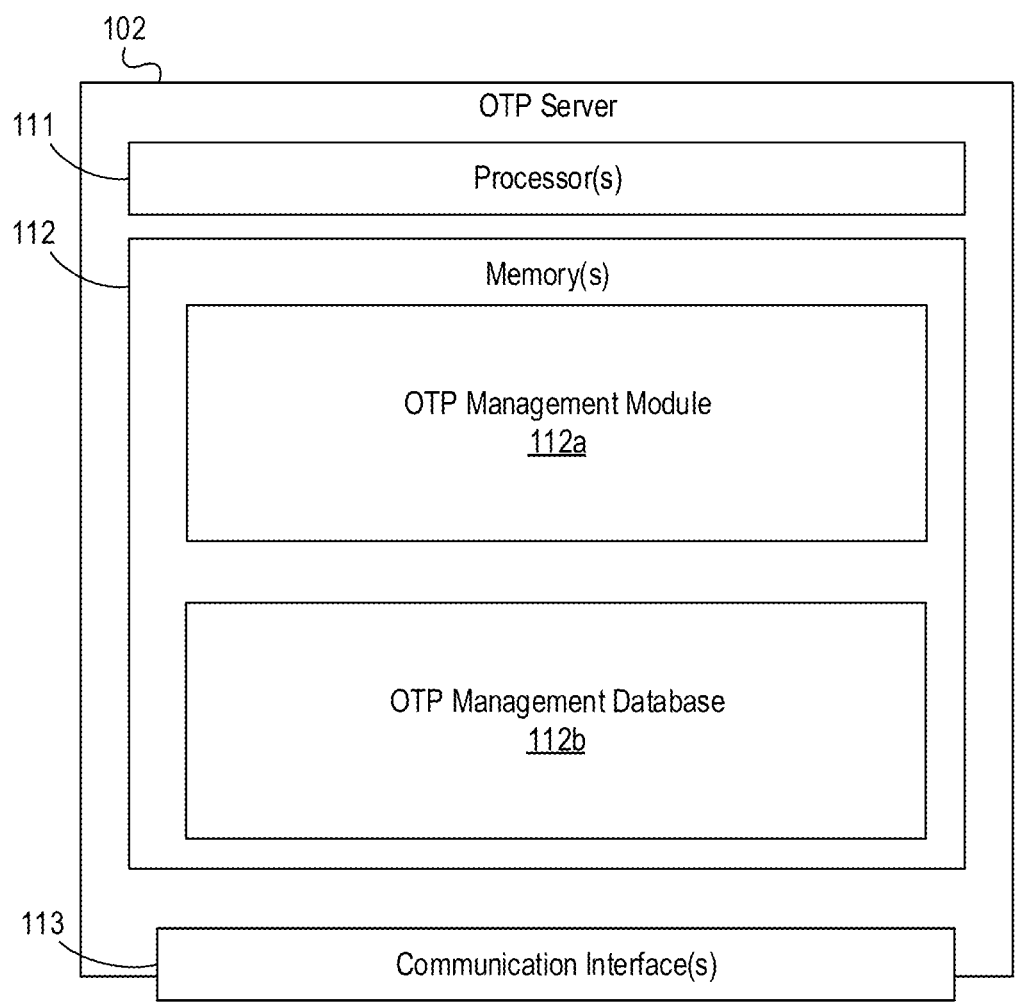
Figure 1C:
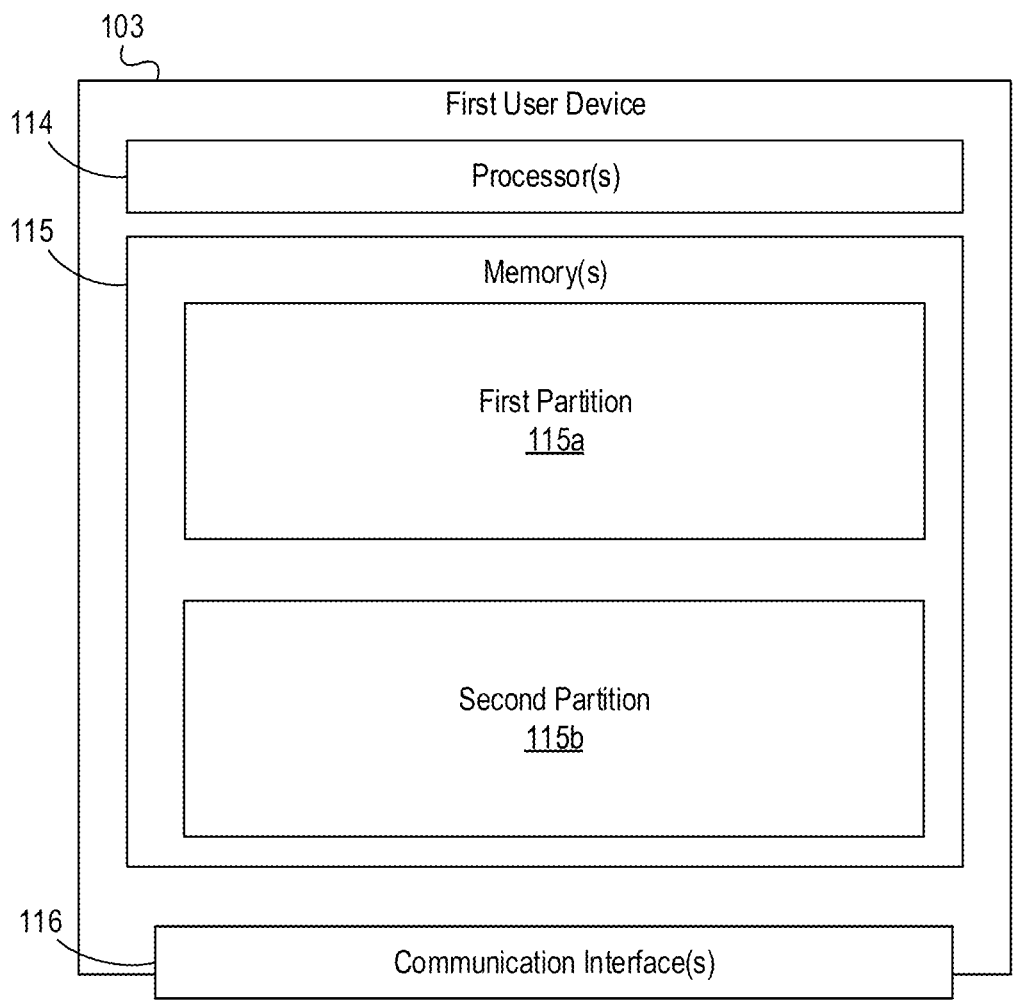

FIGS. 1A-1C depict an illustrative computing environment for using device partitions to provide enhanced security in OTP multi-factor authentication in accordance with one or more example embodiments. Referring to FIG. 1A, computing environment 100 may include one or more computer systems. For example, computing environment 100 may include OTP server 102, first user device 103, and second user device 104.

OTP server 102 may include one or more computing devices and/or other computer components (e.g., processors, memories, communication interfaces, or the like). For example, the OTP server 102 may host one or more services (e.g., online banking services, or the like), and may be configured to validate authentication credentials prior to granting access to such services. In some instances, as part of the authentication process, the OTP server 102 may be configured to generate, send, and validate OTPs, as is described further below.

First user device 103 may be or include one or more devices (e.g., laptop computers, desktop computer, smartphones, tablets, and/or other devices) configured for use in providing authentication credentials to access services (e.g., hosted by the OTP server 102, or the like). In some instances, the first user device 103 may be configured with two or more partitions (e.g., hardware partitions, virtual partitions, or the like). In these instances, the first user device 103 may be configured to send initial authentication credentials using a first partition, and receive an OTP (e.g., to complete authentication) at a different partition. In some instances, the first user device 103 may be configured to display graphical user interfaces (e.g., enrollment interfaces, authentication interfaces, service interfaces, or the like). For illustrative purposes, it may be assumed that, in the event sequence described below, the first user device 103 may be used by a legitimate user (e.g., a valid user of the corresponding credentials). Any number of such user devices may be used to implement the techniques described herein without departing from the scope of the disclosure.

Second user device 104 may be or include one or more devices (e.g., laptop computers, desktop computer, smartphones, tablets, and/or other devices) configured for use in providing authentication credentials to access services (e.g., hosted by the OTP server 102, or the like). In some instances, the second user device 104 may be configured to access information and/or a display of the first user device 103. For example, the second user device 104 may be used by a bad actor with malicious intent (e.g., to obtain confidential information and/or authentication credentials from the first user device 103). In some instances, the second user device 104 may communicate with the OTP server 102 using such stolen credentials in an attempt to authenticate to the OTP server 102. In some instances, the second user device 104 may be configured to display graphical user interfaces (e.g., authentication interfaces, or the like). Any number of such user devices may be used to implement the techniques described herein without departing from the scope of the disclosure.

Computing environment 100 also may include one or more networks, which may interconnect OTP server 102, first user device 103, and second user device 104. For example, computing environment 100 may include a network 101 (which may interconnect, e.g., OTP server 102, first user device 103, and second user device 104).

In one or more arrangements, OTP server 102, first user device 103, and second user device 104 may be any type of computing device capable of receiving a user interface, receiving input via the user interface, and communicating the received input to one or more other computing devices. For example, OTP server 102, first user device 103, and second user device 104, and/or the other systems included in computing environment 100 may, in some instances, be and/or include server computers, desktop computers, laptop computers, tablet computers, smart phones, tablets, or the like that may include one or more processors, memories, communication interfaces, storage devices, and/or other components. As noted above, and as illustrated in greater detail below, any and/or all of OTP server 102, first user device 103, and second user device 104 may, in some instances, be special-purpose computing devices configured to perform specific functions.

Referring to FIG. 1B. OTP server 102 may include one or more processors 111, memory 112, and communication interface 113. A data bus may interconnect processor 111, memory 112, and communication interface 113. Communication interface 113 may be a network interface configured to support communication between OTP server 102 and one or more networks (e.g., network 101, or the like). Memory 112 may include one or more program modules having instructions that when executed by processor 111 cause OTP server 102 to perform one or more functions described herein and/or one or more databases that may store and/or otherwise maintain information which may be used by such program modules and/or processor 111. In some instances, the one or more program modules and/or databases may be stored by and/or maintained in different memory units of OTP server 102 and/or by different computing devices that may form and/or otherwise make up OTP server 102. For example, memory 112 may have, host, store, and/or include OTP management module 112a and OTP management database 112b. OTP management module 112a may have instructions that direct and/or cause OTP server 102 to execute advanced techniques for generating, sending, and validating OTPs, initiating security actions, and/or performing other actions. OTP management database 112b may store information used by OTP management module 112a, and/or other modules in generating, sending, and validating OTPs, initiating security actions, and/or performing other actions.

Referring to FIG. 1C, first user device 103 may include one or more processors 114, memory 115, and communication interface 116. A data bus may interconnect processor 114, memory 115, and communication interface 116. Communication interface 116 may be a network interface configured to support communication between first user device 103 and one or more networks (e.g., network 101, or the like). Memory 115 may include one or more program modules having instructions that when executed by processor 114 cause first user device 103 to perform one or more functions described herein and/or one or more databases that may store and/or otherwise maintain information which may be used by such program modules and/or processor 114. In some instances, the one or more program modules and/or databases may be stored by and/or maintained in different memory units of first user device 103 and/or by different computing devices that may form and/or otherwise make up first user device 103. For example, memory 115 may have, host, store, and/or include first partition 115a and second partition 115b. In some instances, first partition 115a and second partition 115b may be virtual partitions or hardware partitions. Although two partitions are shown, this is for illustrative purposes only and any number of partitions may be included without departing from the scope of the disclosure.

Figure 2A:
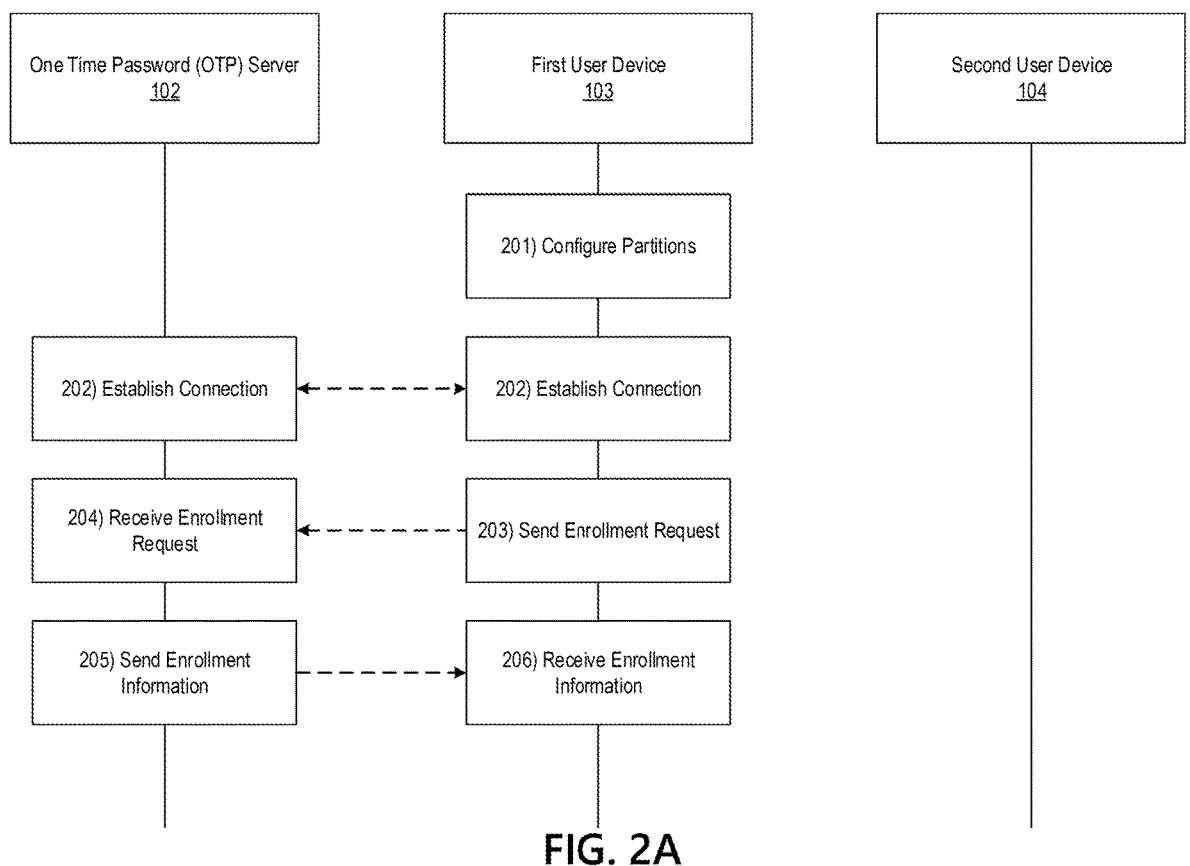
FIGS. 2A-2E depict an illustrative event sequence for using device partitions to provide enhanced security in OTP multi-factor authentication in accordance with one or more example embodiments.

FIGS. 2A-2E depict an illustrative event sequence for using device partitions to provide enhanced security in OTP multi-factor authentication in accordance with one or more example embodiments. Referring to FIG. 2A, at step 201, the first user device 103 may configure a plurality of partitions. For example, the first user device 103 may configure itself to include at least two partitions, which may, in some instances, include hardware and/or virtual partitions (e.g., as is illustrated in FIG. 1C). In configuring the hardware partitions, the first user device 103 may divide the first user device 103 into two or more segments, and may use different copies of an operating system on each of the physical partitions. In configuring the virtual partitions, the first user device 103 might not divide the existing hardware physically, but may use a virtual operating system on a single physical partition, and may use multiple operating systems to create two virtually different devices on the first user device 103. In either instance, the first user device 103 may be configured to use a common SIM card and/or phone number. In some instances, the first user device 103 may configure partitions of different sizes/capacities. For example, a first partition may be configured solely for the use in receiving OTPs, whereas the second partition may be used to perform all other functions of the first user device 103.

In some instances, the first user device 103 may be configured by an administrator of the first user device 103 (e.g., an information technology (IT) professional of an organization, or the like) and/or by a user of the first user device 103. In some instances, in configuring the partitions, the first user device 103 may configure each partition with different authentication credentials. For example, a first partition may accept a first credential and a second partition may accept a second credential. In some instances, these credentials may be biometric credentials such as a fingerprint, faceprint, or the like.

In some instances, the first user device 103 may be configured to navigate between the partitions based on receiving a selection of an interface tile that corresponds to a desired partition. Additionally or alternatively, the first user device 103 may be configured to navigate between the partitions by receiving a swipe input (e.g., left or right), which may, e.g., cause the first user device 103 to transition between the partitions sequentially. Additionally or alternatively, the first user device 103 may be configured to navigate between the partitions by receiving a biometric input.

At step 202, the first user device 103 may establish a connection with the OTP server 102. For example, the first user device 103 may establish a first wireless data connection with the OTP server 102 to link the first user device 103 to the OTP server 102 (e.g., in preparation for sending enrollment and/or login requests). In some instances, the first user device 103 may identify whether or not a connection is already established with the OTP server 102. If a connection is already established with the OTP server 102, the first user device 103 might not re-establish the connection. If a connection is not yet established with the OTP server 102, the first user device 103 may establish the first wireless data connection as described herein.

At step 203, the first user device 103 may send an enrollment request to the OTP server 102. For example, the first user device 103 may send a request to enroll in a service provided by the OTP server 102 (e.g., an online banking service, or the like). In some instances, the first user device 103 may send the enrollment request while the first wireless data connection is established.

At step 204, the OTP server 102 may receive the enrollment request sent at step 203. For example, the OTP server 102 may receive the enrollment request via the communication interface 113 and while the first wireless data connection is established.

At step 205, the OTP server 102 may send enrollment information to the first user device 103. For example, the OTP server 102 may send login credentials and/or OTP instructions. For example, with regard to the OTP instructions, the OTP server 102 may send information indicating that, in some instances, one or more decoy (e.g., invalid) OTPs may be sent in advance of a valid OTP. In some instances, decoy OTPs might not be sent at every login attempt. For example, decoy OTPs may be randomly sent, sent at a predetermined interval (e.g., every third login attempt, or the like), and/or otherwise. The OTP instructions may indicate, to a user of the first user device 103, how to distinguish between the valid and decoy OTPs. For example, the OTP instructions may indicate that in some instances, a second OTP sent may be the valid OTP. The OTP instructions may further indicate, in this example, that if the second OTP is the valid OTP, the user will receive a notification, upon requesting the OTP, that they will receive their OTP in "just a second." This is shown, for example, in graphical user interface 500, which is shown in FIG. 5. In some instances, the OTP instructions may indicate other similar techniques to differentiate between decoy and valid OTPs. For example, in some instances, rather than a natural language indication of which OTP may be correct as is described above, a numeric value may be included somewhere in the OTP instructions (and may, e.g., be displayed in an obscure portion of an interface). Additionally or alternatively, the OTP instructions may indicate that symbols, words, or numeric values may be placed strategically within an interface to indicate which OTP is valid (e.g., top left position=first OTP is valid, top right position=second OTP is valid, or the like).

Additionally or alternatively, the OTP instructions may describe how to identify a partition of the first user device 103 at which the valid OTP is received. In doing so, the OTP instructions may save the user from logging into every partition of their device to locate the OTP. For example, the OTP instructions may indicate the partition using natural language, numeric values, symbols, and/or otherwise as described above. For example, as shown in graphical user interface 600 of FIG. 6, the OTP instructions may indicate that a particular position of a symbol on a login screen may indicate a numeric value corresponding to the correct partition.

These OTP instructions are merely illustrative, and many other variations may be used without departing from the scope of the disclosure. Nevertheless, such OTP instructions may indicate how to distinguish between valid and decoy OTPs, as well as at which partition to locate the OTP.

In some instances, the OTP server 102 may send the enrollment information to the first user device 103 via the communication interface 113 and while the first wireless data connection is established. In some instances, the OTP server 102 may also send one or more commands directing the first user device 103 to display the enrollment information.

At step 206, the first user device 103 may receive the enrollment information sent at step 205. For example, the first user device 103 may receive the enrollment information while the first wireless data connection is established. In some instances, the first user device 103 may also receive the one or more commands directing the first user device 103 to display the enrollment information.

Figure 2B:
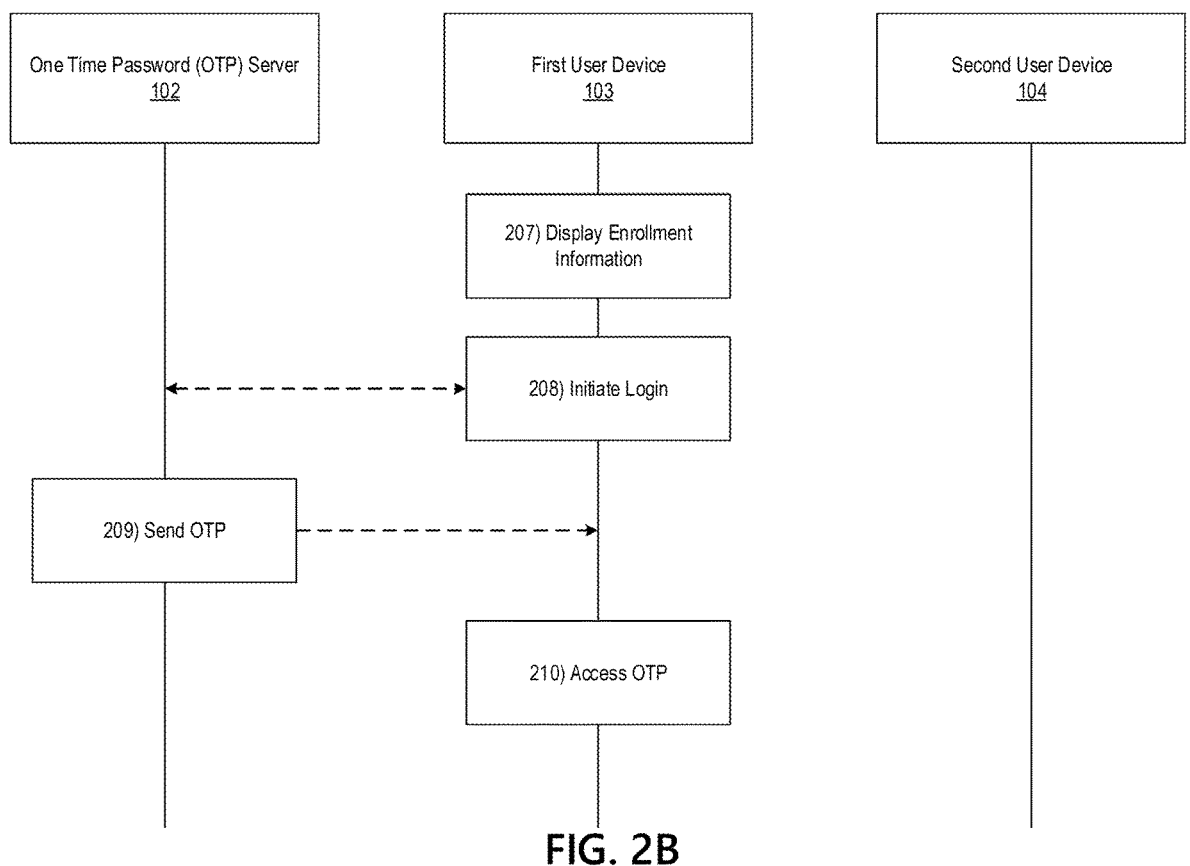

Referring to FIG. 2B, at step 207, based on or in response to the one or more commands directing the first user device 103 to display the enrollment information, the first user device 103 may display the enrollment information. For example, the first user device 103 may display OTP instructions using a graphical user interface similar to graphical user interface 500 of FIG. 5, graphical user interface 600 of FIG. 6, and/or other interfaces.

At step 208, the first user device 103 may initiate a login with the OTP server 102. For example, the first user device 103 may communicate with the OTP server 102 to send initial authentication credentials, such as a username/password combination. In these instances, the OTP server 102 may validate the initial credentials, and may proceed to step 209 assuming the credentials are valid. If the credentials are not valid, the OTP server 102 might not proceed, and may instead await valid credentials. In some instances, the first user device 103 may communicate with the OTP server 102 while the first wireless data connection is established. In some instances, the first user device 103 may communicate with the OTP server 102 using a first partition of the first user device 103.

At step 209, the OTP server 102 may send one or more OTPs to the first user device 103. For example, the OTP server 102 may send at least a valid OTP, and may, in some instances, additionally send one or more decoy OTPs (which may, e.g., be invalid). In some instances, the OTP server 102 may send the one or more OTPs to a different partition of the first user device 103 (e.g., a different partition than the first user device 103 used to initiate the login at step 208). In some instances, the OTP server 102 may send different portions of an OTP to different partitions of the first user device 103. In some instances, the OTP server 102 may rotate and/or otherwise change which partition the OTP is sent to each time a login attempt is received. For example, the OTP server 102 may send the OTP to a second partition after receiving a first login attempt, and to a third partition after receiving a second login attempt. In some instances, in sending the OTP, the OTP server 102 may send texts, voice messages, email messages, and/or other messages.

At step 210, the first user device 103 may access the OTP. For example, in some instances, the first user device 103 may identify one or more partitions that include the OTP (e.g., based on an interface displayed at the first user device 103 and the OTP instructions received upon enrollment). Once the one or more partitions have been identified, the first user device 103 may prompt for and receive the authentication credentials corresponding to each partition. For example, the first user device 103 may receive a biometric authenticator such as a face scan, fingerprint, or the like. In some instances, these credentials may be different for each partition (e.g., one finger for first partition, two fingers for second partition, or the like).

Once the correct partitions have been accessed, the first user device 103 may avoid the use of decoy OTPs, and may identify the correct OTP (e.g., based on the OTP instructions received upon enrollment and any indications on the initial login screen). For example, the first user device 103 may avoid selecting a first OTP known to be a decoy, and may instead select a second OTP known to be valid.

In some instances, where the valid OTP has been split between multiple partitions, the first user device 103 may automatically assemble the OTP based on biometric authentication of the user of the first user device 103 (e.g., via a face scan, fingerprint, and/or other biometric identifier).

In some instances, in accessing the OTP, the first user device 103 may display the OTP in a concealed manner. For example, the first user device 103 may display a number of asterisks rather than the OTP itself (e.g., "********" rather than "password"). In some instances, in accessing the first user device 103, the first user device 103 may accept a duress code (which may, e.g., have previously been provided to the user at enrollment), display a duress interface element (which may, e.g., simply be selected by the user), and/or otherwise present a duress option, which the user may select as needed if they are in a duress situation (e.g., being forced to enter the OTP, someone else is viewing the OTP, and/or otherwise). In these instances, the first user device 103 may contact an authority and/or other individual who may be able to provide support. Furthermore, the first user device 103 may notify the OTP server 102, which may, e.g., prevent the OTP server 102 from granting access to the first user device 103 despite receiving a correct OTP.

Figure 2C:
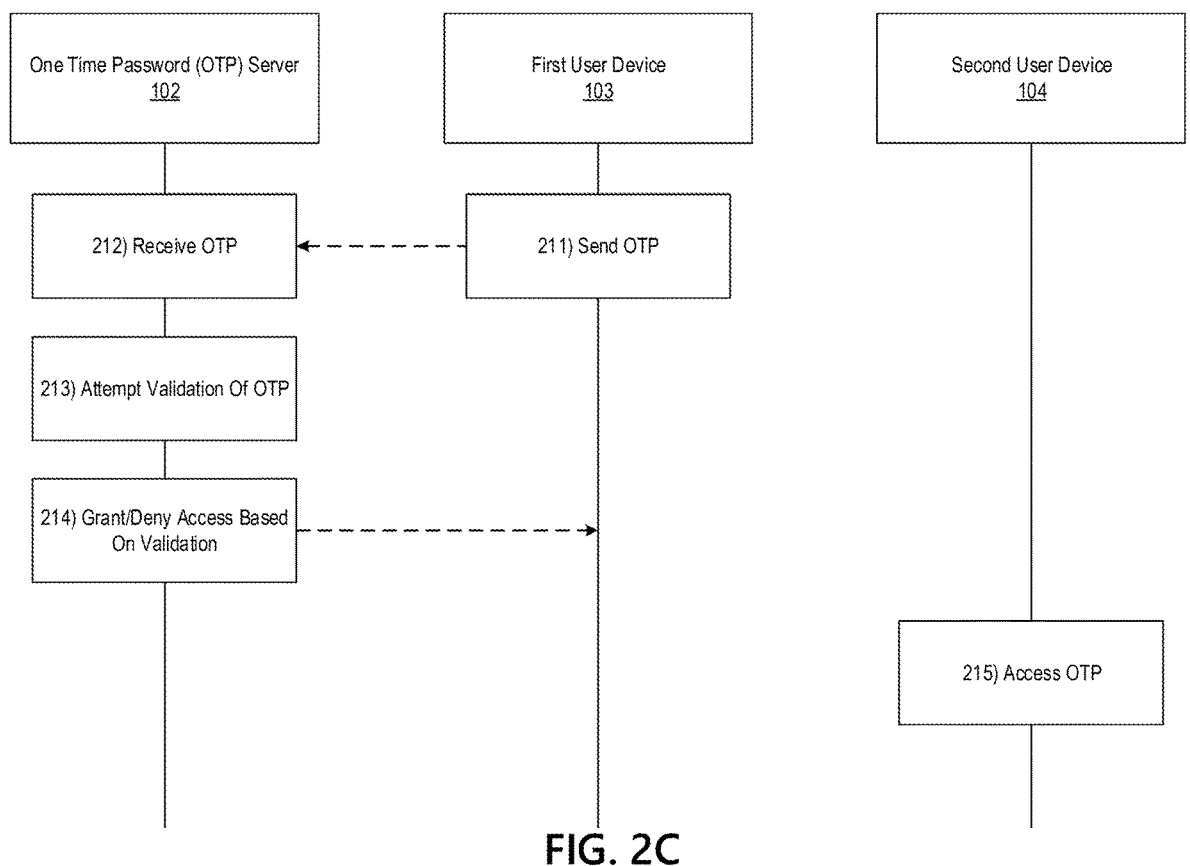

Referring to FIG. 2C, at step 211, once the first user device 103 has accessed the OTP, it may send the OTP to the OTP server 102. For example, the first user device 103 may send the OTP to the OTP server 102 while the first wireless data connection is established.

At step 212, the OTP server 102 may receive the OTP sent at step 211. For example, the OTP server 102 may receive the OTP via the communication interface 113 and while the first wireless data connection is established.

At step 213, the OTP server 102 may attempt validation of the OTP. For example, the OTP server 102 may compare the received OTP against the known valid OTP.

At step 214, the OTP server 102 may either grant or deny access of services provided by the OTP server 102 to the first user device 103. For example, if the OTP was validated, the OTP server 102 may grant access to the first user device 103.

Otherwise, if the OTP was not validated (or if a decoy OTP was received), the OTP server 102 may deny access to the first user device 103.

Although the following steps 215-221 are shown as occurring after steps 210-214, they may, in some instances, occur prior to or simultaneously with such steps without departing from the scope of the disclosure.

At step 215, the second user device 104 may access the OTP. For example, the second user device 104 may be able to access sensitive information at the first user device 103 and/or otherwise view a display of the first user device 103 such that it may obtain an OTP. In some instances, the second user device 104 may obtain a decoy OTP. In some instances, the second user device 104 might not be able to access the OTP (e.g., due to an inability to access a correct partition of the first user device 103) or assemble all pieces of an OTP that has been split across various partitions. In instances where the second user device 104 does obtain a decoy OTP, the second user device 104 may proceed to step 216.

Figure 2D:
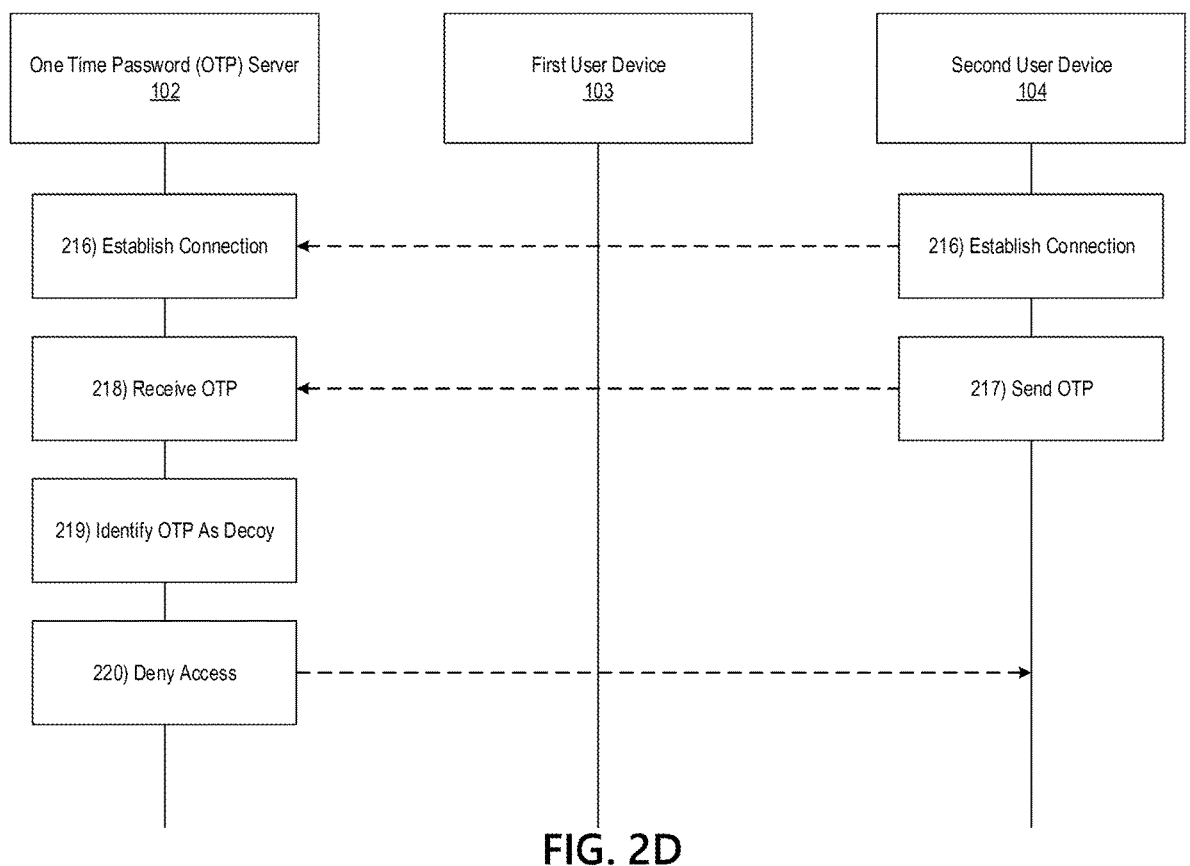

Referring to FIG. 2D, at step 216, the second user device 104 may establish a connection with the OTP server 102. For example, the second user device 104 may establish a second wireless data connection with the OTP server 102 to link the second user device 104 to the OTP server 102 (e.g., in preparation for sending OTPs). In some instances, the second user device 104 may identify whether or not a connection is already established with the OTP server 102. If a connection is already established with the OTP server 102, the second user device 104 might not re-establish the connection. If a connection is not yet established with the OTP server 102, the second user device 104 may establish the second wireless data connection as described herein.

At step 217, the second user device 104 may send the decoy OTP to the OTP server 102. For example, the second user device 104 may send the decoy OTP to the OTP server 102 while the second wireless data connection is established.

At step 218, the OTP server 102 may receive the decoy OTP sent at step 217. For example, the OTP server 102 may receive the decoy OTP via the communication interface 113 and while the second wireless data connection is established.

At step 219, the OTP server 102 may identify the decoy OTP as a decoy OTP (e.g., by comparing the decoy OTP to previously generated decoy OTPs). At step 220, based on or in response to identifying the decoy OTP, the OTP server 102 may deny access to the second user device 104.

Figure 2E:
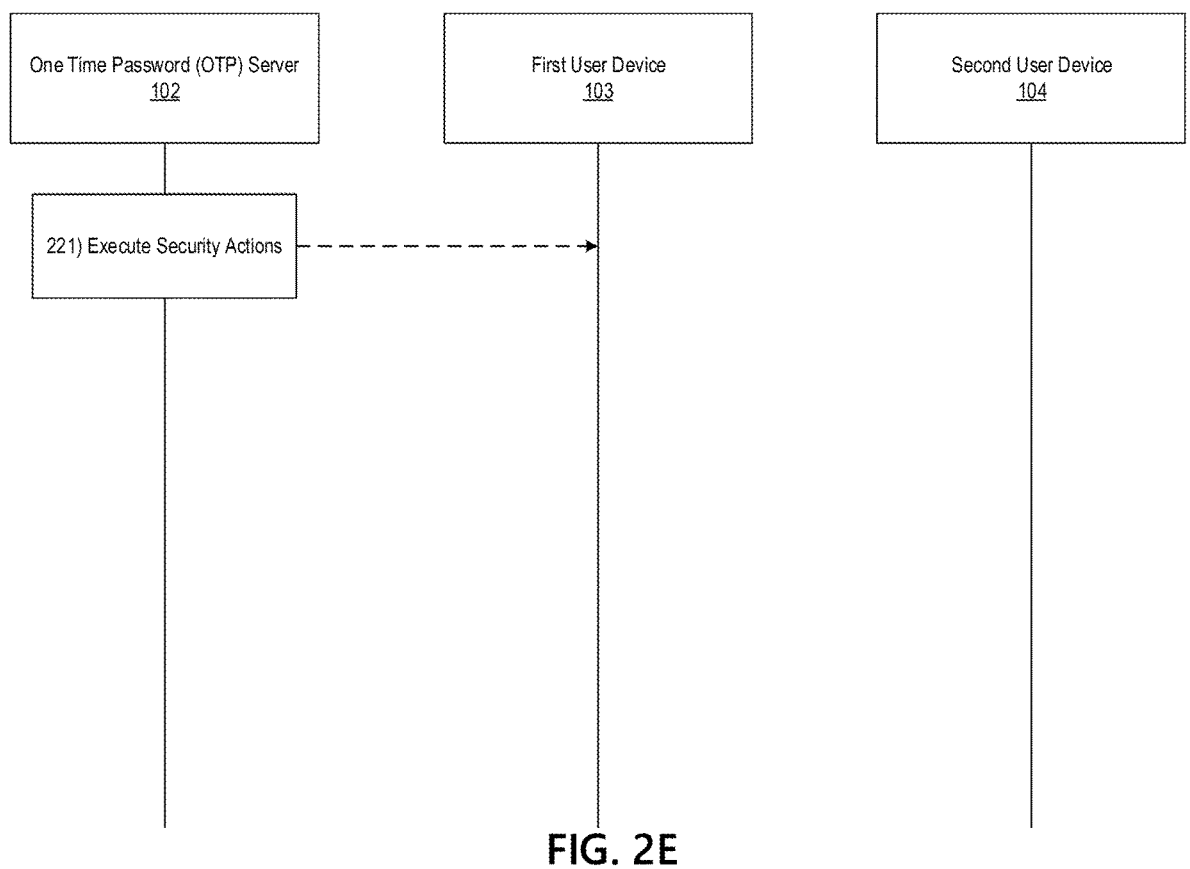

Referring to FIG. 2E, at step 221, the OTP server 102 may execute one or more security actions. For example, the OTP server 102 may send one or more commands directing the first user device 103 to run or otherwise expose other decoy OTPs on different partitions to identify which partitions may be compromised. Additionally or alternatively, the OTP server 102 may monitor the partitions to identify whether or not the user of the second user device 104 is attempting to use the decoy OTP for the correct service. Additionally or alternatively, the OTP server 102 may send one or more commands directing the first user device 103 to wipe (e.g., delete data, restore to factory settings, or otherwise make data unreadable on), one or more partitions. Additionally or alternatively, the OTP server 102 may send one or more commands directing the first user device 103 to lock one or more partitions. Additionally or alternatively, the OTP server 102 may send a code to be entered at the first user device 103, and may lock or wipe the first user device 103 if the correct code is not entered in time. Additionally or alternatively, the OTP server 102 may trace use of actions by the user of the second user device 104 (e.g., based on the decoy OTP or otherwise). Additionally or alternatively, the OTP server 102 may execute other security actions without departing from the scope of the disclosure.

Figure 3:
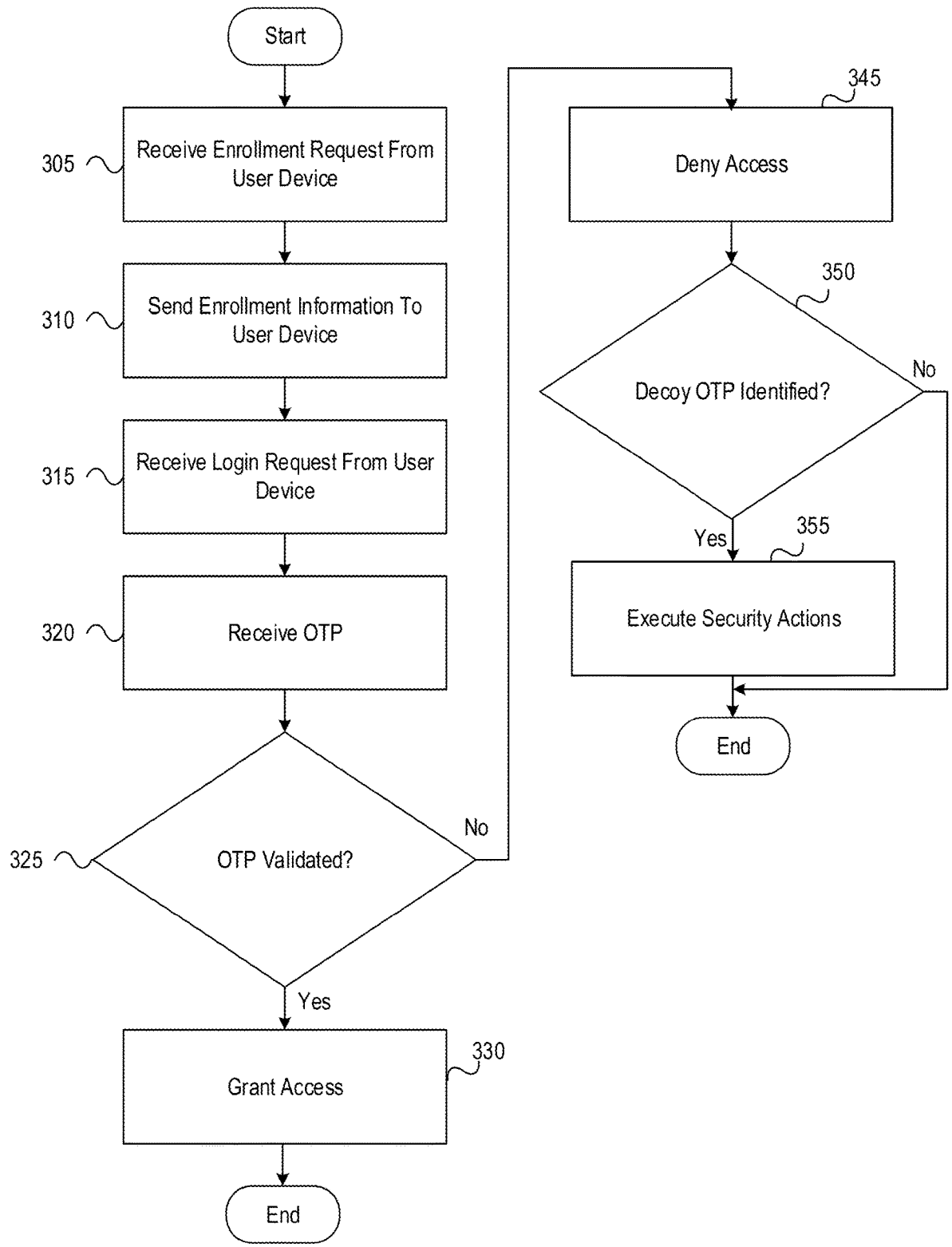
FIGS. 3 and 4 depict illustrative methods for using device partitions to provide enhanced security in OTP multi-factor authentication in accordance with one or more example embodiments.

FIG. 3 depicts an illustrative method for using device partitions to provide enhanced security in OTP multi-factor authentication in accordance with one or more example embodiments. Referring to FIG. 3, at step 305, a computing platform comprising a memory, one or more processors, and a communication interface may receive an enrollment request from a user device. At step 310, the computing platform may send enrollment information to the user device. At step 315, the computing platform may receive a login request from the user device. At step 320, the computing platform may receive an OTP. At step 325, the computing platform may identify whether or not the OTP is validated. If the OTP is validated, the computing platform may proceed to step 330, and may grant access to the requestor.

Returning to step 325, if the computing platform identifies that the OTP is not validated, it may proceed to step 345 to deny access to the requestor. At step 350, the computing platform may identify whether the OTP is a decoy OTP. If a decoy OTP is not identified, the method may end. Otherwise, if a decoy OTP is identified, the computing platform may proceed to step 355. At step 355, the computing platform may execute one or more security actions.

Figure 4:
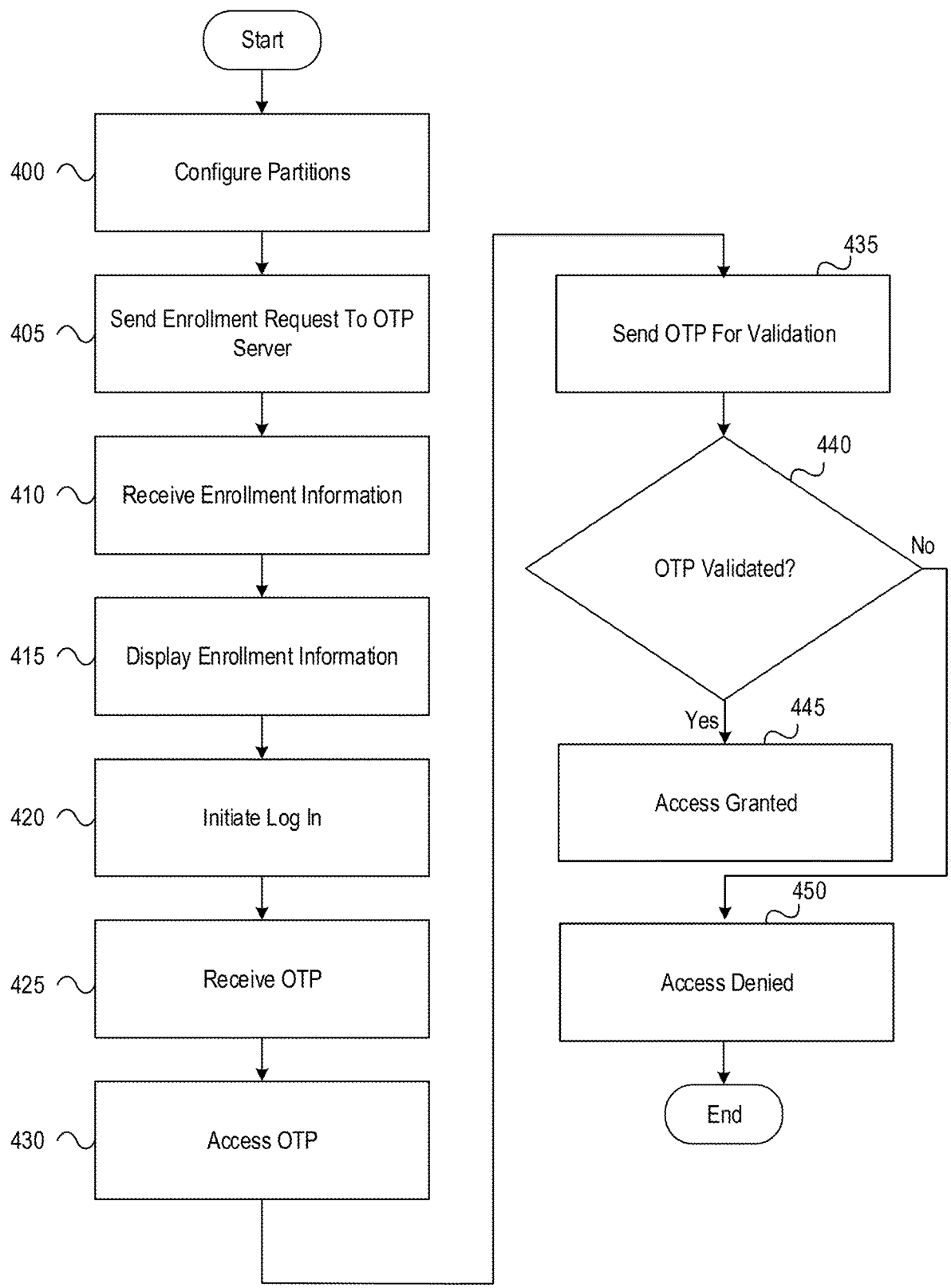

FIG. 4 depicts an illustrative method for using device partitions to provide enhanced security in OTP multi-factor authentication in accordance with one or more example embodiments. Referring to FIG. 4, at step 400, a computing device comprising a memory, one or more processors, and a communication interface may configure a plurality of device partitions. At step 405, the computing device may send an enrollment request to an OTP server. At step 410, the computing device may receive enrollment information. At step 415, the computing device may display enrollment information. At step 420, the computing device may initiate a login process. At step 425, the computing device may receive an OTP. At step 430, the computing device may access the OTP. At step 435, the computing device may send the OTP for validation. At step 440, the computing device may identify whether or not the OTP was validated. If the OTP was validated, the computing device may proceed to step 445 where service access may be granted. Otherwise, if the OTP was not validated, the computing device may proceed to step 450 where service access might not be granted.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing device comprising:
   at least one processor;
   a communication interface communicatively coupled to the at least one processor; and
   memory storing computer-readable instructions that, when executed by the at least one processor, cause the computing device to:
   configure a plurality of device partitions;
   send, to a one time password (OTP) server and via an interface of a first partition of the plurality of device partitions, a login request;
   receive, from the OTP server, a notification indicating a decoy OTP, wherein the notification identifies characteristics of an interface, to be displayed based on the login request, to warn of the decoy OTP, and wherein the decoy OTP is selectively sent in response to a portion of login requests, wherein the characteristics comprise one or more of: an indication that a particular number of decoy OTPs will be sent in advance of a valid OTP, an indication that OTPs may be sent for only a portion of login attempts, or an indication of how to distinguish between valid and decoy OTPs;
   receive, at a second partition of the plurality of device partitions, an OTP;
   access, by validating authentication credentials corresponding to the second partition of the plurality of device partitions, the OTP;
   send, to the OTP server, the OTP; and
   access, upon receiving confirmation of validation of the OTP, services hosted by the OTP server.

2. The computing device of claim 1, wherein the plurality of device partitions include: one or more hardware partitions and one or more virtual partitions.

3. The computing device of claim 1, wherein receiving, at the second partition of the plurality of device partitions, the OTP comprises receiving a first portion of the OTP, wherein a second portion of the OTP is received at a third partition of the plurality of device partitions.

4. The computing device of claim 3, wherein the memory stores additional computer readable instructions that, when executed by the at least one processor, cause the computing device to:
   automatically assemble, after validating authentication credentials corresponding to the third partition of the plurality of device partitions, the OTP using the first portion and the second portion.

5. The computing device of claim 4, wherein the authentication credentials corresponding to the second partition of the plurality of device partitions are different than the authentication credentials corresponding to the third partition of the plurality of device partitions.

6. The computing device of claim 1, wherein accessing the OTP comprises accessing a decoy OTP prior to accessing the OTP.

7. The computing device of claim 6, wherein the memory stores additional computer readable instructions that, when executed by the at least one processor, cause the computing device to:
   enroll, prior to sending the login request, with the OTP server.

8. The computing device of claim 6, wherein the OTP server is configured to:
   identify use of the decoy OTP by a different computing device, and
   initiate, based on identification of the decoy OTP by the different computing device, one or more security actions.

9. The computing device of claim 8, wherein the one or more security actions comprise one or more of:
   tracing the different computing device, wiping the computing device, locking at least one of the plurality of device partitions, prompting for entry of a code at the computing device, or notifying an authority.

10. The computing device of claim 1, wherein the authentication credentials comprise biometric credentials.

11. The computing device of claim 1, wherein the OTP is sent to a randomly selected partition of the plurality of device partitions each time a login request is received.

12. The computing device of claim 1, wherein the indication comprises a natural language indication to distinguish between valid and decoy OTPs, and wherein the natural language indication indicates a particular phrase indicating that a subsequently received OTP will be a valid OTP.

13. The computing device of claim 1, wherein the indication comprises a numeric value displayed within the interface, wherein the numeric value indicates which OTP of a series of received OTPs is valid.

14. The computing device of claim 1, wherein a position of the indication within the interface indicates which OTP of a series of received OTPs is valid.

15. The computing device of claim 1, wherein a position of the indication within the interface indicates a numeric value corresponding to a correct partition for use in accessing the OTP.

16. The computing device of claim 1, wherein the second partition is accessed based on detection of a swipe input during access of the first partition.

17. The computing device of claim 1, wherein the first partition is configured only for receipt of OTPs, and wherein the second partition is configured to perform all other functions of the computing device.

18. The computing device of claim 1, wherein authentication credentials for the first partition comprise a single finger biometric scan and wherein authentication credentials for the second partition comprise a multi-finger biometric scan.

19. A method comprising:
at a computing device comprising at least one processor, a communication interface, and memory:
configuring a plurality of device partitions;
sending, to a one time password (OTP) server and via an interface of a first partition of the plurality of device partitions, a login request;
receiving, from the OTP server, a notification indicating a decoy OTP, wherein the notification identifies characteristics of an interface, to be displayed based on the login request, to warn of the decoy OTP, and wherein the decoy OTP is selectively sent in response to a portion of login requests, wherein the characteristics comprise one or more of: an indication that a particular number of decoy OTPs will be sent in advance of a valid OTP, an indication that OTPs may be sent for only a portion of login attempts, or an indication of how to distinguish between valid and decoy OTPs;
receiving, at a second partition of the plurality of device partitions, an OTP;
accessing, by validating authentication credentials corresponding to the second partition of the plurality of device partitions, the OTP;
sending, to the OTP server, the OTP; and
accessing, upon receiving confirmation of validation of the OTP, services hosted by the OTP server.

20. One or more non-transitory computer-readable media storing instructions that, when executed by a computing device comprising at least one processor, a communication interface, and memory, cause the computing device to:
configure a plurality of device partitions;
send, to a one time password (OTP) server and via an interface of a first partition of the plurality of device partitions, a login request;
receive, from the OTP server, a notification indicating a decoy OTP, wherein the notification identifies characteristics of an interface, to be displayed based on the login request, to warn of the decoy OTP, and wherein the decoy OTP is selectively sent in response to a portion of login requests, wherein the characteristics comprise one or more of: an indication that a particular number of decoy OTPs will be sent in advance of a valid OTP, an indication that OTPs may be sent for only a portion of login attempts, or an indication of how to distinguish between valid and decoy OTPs;
receive, at a second partition of the plurality of device partitions, an OTP;
access, by validating authentication credentials corresponding to the second partition of the plurality of device partitions, the OTP;
send, to the OTP server, the OTP; and
access, upon receiving confirmation of validation of the OTP, services hosted by the OTP server.

* * * * *